United States Patent [19]

Gobaud

[11] 4,219,768
[45] Aug. 26, 1980

[54] METHOD FOR REGULATING THE VOLTAGE OF AN ELECTRIC GENERATOR AND A SYSTEM FOR THE APPLICATION OF SAID METHOD

[75] Inventor: Michel Gobaud, Angouleme, France

[73] Assignee: Moteurs Leroy-Somer, Angouleme, France

[21] Appl. No.: 968,787

[22] Filed: Dec. 12, 1978

[30] Foreign Application Priority Data

Dec. 27, 1977 [FR] France .................. 77 39289

[51] Int. Cl.² .......................................... H02P 9/00
[52] U.S. Cl. ........................................ 322/8; 322/28; 322/32; 322/98
[58] Field of Search .................. 322/7, 8, 44, 28, 32, 322/95–98, 89–94

[56] References Cited

U.S. PATENT DOCUMENTS

| | | | |
|---|---|---|---|
| 3,215,935 | 11/1965 | Mead, Jr. et al. | 322/98 X |
| 3,234,397 | 2/1966 | Park | 322/8 X |
| 3,705,721 | 12/1972 | Lulay et al. | 322/28 X |
| 3,769,567 | 10/1973 | Cox | 322/91 X |
| 3,862,430 | 1/1975 | Lenhart . | |

FOREIGN PATENT DOCUMENTS 1589454 3/1970 France .
2294573 7/1976 France .

Primary Examiner—Robert J. Hickey
Attorney, Agent, or Firm—Young & Thompson

[57] ABSTRACT

The method for regulating the terminal voltage delivered by an independent alternating-current generator consists in measuring the voltage in at least one phase, in measuring and automatically adjusting the frequency with respect to a reference value by putting dissipative resistors in circuit, and in automatically varying the reference value of the frequency as a function of variations in voltage. The invention achieves stable voltage control which prevents harmful oscillations and is applicable in particular to asynchronous generators which are driven by a natural fluid.

7 Claims, 5 Drawing Figures

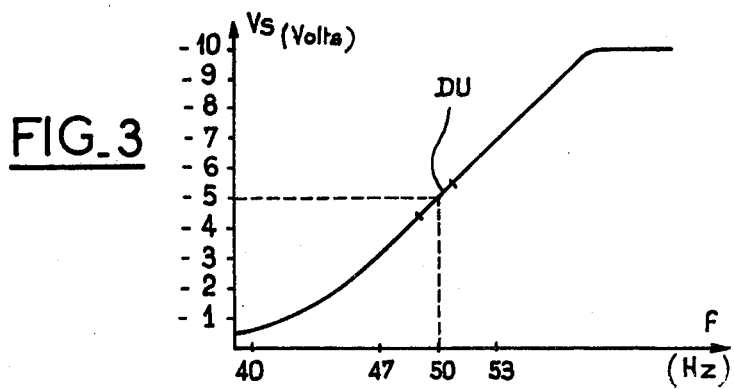
FIG. 3
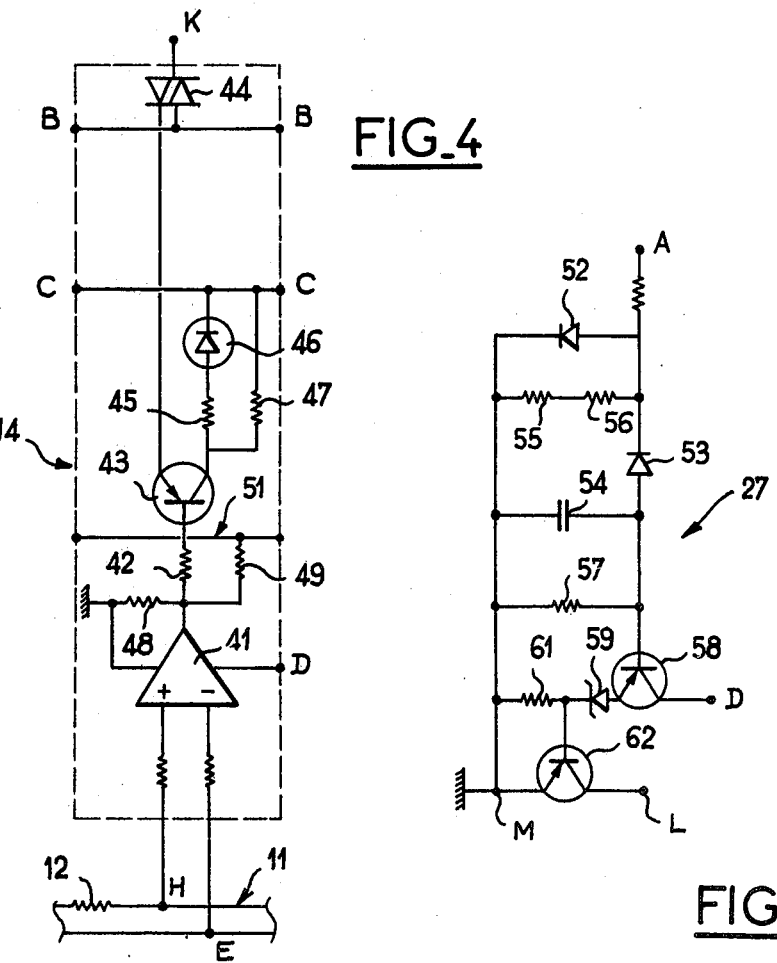
FIG. 4
FIG. 5

METHOD FOR REGULATING THE VOLTAGE OF AN ELECTRIC GENERATOR AND A SYSTEM FOR THE APPLICATION OF SAID METHOD

This invention relates to a method for regulating the terminal voltage of an independent, variable-speed alternating-current generator such as a generator driven by a machine under the action of a natural fluid.

The invention is also concerned with a system for carrying out said method.

In the great majority of cases and especially in industrial countries, electric power is generated by alternators coupled together by means of a power supply system. Thus the problem of operational stability entails the need to prevent tripping of a generator.

On the other hand, in thinly populated countries which have a low level of industrial development, it may prove advisable to provide small independent systems for delivering electric power to small groups of consumers. Each power supply system can thus be constituted by a single generator for converting energy from a natural source which will consist of a watercourse in the majority of instances.

Under these conditions, the most rational solution consists in immersing in the watercourse a turboelectric set enclosed within a bulb. However, an alternator is not well suited to such operating conditions since it is exposed to moisture and is liable to be subjected to dangerous overspeeds by reason of the fact that a watercourse has a more or less irregular flow rate.

One solution which circumvents all these disadvantages consists in making use of an asynchronous generator. The squirrel-cage rotor of a generator of this type permits of considerable overspeeds without any attendant risk of damage. Furthermore, the generator winding can be completely coated with a resin or immersed in oil, whereas this arrangement is impossible in an alternator on account of the brushes.

This absence of brushes in an asynchronous generator has the further advantage of ensuring longer service life without maintenance. These considerations point to the construction within an immersed bulb with its additional advantages of cooling and suppression of atmospheric noise. Finally, the cost price of an asynchronous generator is distinctly lower than that of an alternator.

On the other hand, it is a relatively difficult matter to ensure stability of operation of an asynchronous generator. It is known that this type of machine starts up automatically when it is provided with capacitors between the phases by virtue of the residual magnetism. After start-up, however, the output voltage and the frequency of the current are directly dependent on the power required, which is essentially variable in a multipurpose power system. The problem which therefore arises consists in stabilizing at least the output voltage.

It is a known practice to measure the output voltage and, when a voltage variation occurs, to initiate the operation of a regulating device as a function of an error signal; this device can be constituted by dissipative resistors which are put into service selectively. However, as is often the case in the field of voltage regulation, this method gives rise to oscillations which cannot readily be damped.

A first aim of the present invention is to provide a method for regulating the voltage delivered by an independent alternating-current generator without giving rise to harmful oscillations.

According to a first aspect of the invention, the method for regulating the terminal voltage of an independent, variable-speed alternating-current generator such as a generator driven by a machine under the action of a natural fluid and especially an asynchronous generator, essentially consists in carrying out the following operations:

(a) the voltage is measured in at least one of the phases of the generator;

(b) the frequency is measured and adjusted automatically with respect to a reference value by putting dissipative resistors in circuit;

(c) the reference value of the frequency is varied automatically as a function of the variations in voltage, the variation in reference value being in the opposite direction to the variation in measured voltage.

Although the final controlled quantity is in fact the voltage, this quantity does not produce a correcting action on the frequency. The frequency constitutes a variable on which direct action is produced by the regulating means or in other words the dissipative resistors on the principle of a so-called cascade control system.

In point of fact, by reason of the considerable mechanical inertia of the assembly constituted by the moving mechanical elements (turbine, gear-drive system, generator) and by the mass of water which is also in motion, the frequency has the advantage of self-regulation and is thus made much more stable than the voltage. The result thereby achieved is stable control which is free from oscillations.

In one advantageous embodiment of the method, the measured frequency is converted to an analog d.c. voltage and the reference value is materialized in the form of a reference potential which is a function of the voltage produced by the generator.

According to a second aspect of the invention, the system for regulating the terminal voltage of an independent, variable-speed alternating-current generator such as a generator of the asynchronous type which is driven by a machine under the action of a natural fluid, for example, especially for the application of a method as hereinabove described, is characterized in that it comprises:

(a) means for measuring the voltage in at least one of the phases of the generator;

(b) means for measuring the frequency;

(c) means for determining a reference value of frequency;

(d) means for comparing the measured frequency with the reference value and for putting the dissipative resistors in circuit when the measured frequency becomes higher than the reference value;

(e) means responsive to the measured voltage in order to cause a variation in the reference value of the frequency in the direction opposite to the variations in measured voltage.

In a preferred embodiment of the invention, the means for putting the dissipative resistors in circuit comprise in the case of each resistor a comparator whose inputs are connected respectively to a reference potential source and to one point of a chain of resistors in series; one end of said chain is in turn connected to the reference potential source and the other end is connected to the output of a transducer; said transducer is intended to deliver a direct-current voltage which is proportional to the frequency of the current delivered by the generator; and the output of each comparator is connected to the control input of a switch which is in series with each dissipative resistor; each point of the chain of resistors defines a predetermined voltage of intermediate value between the reference voltage and the voltage which is delivered by the transducer and represents the frequency. The operating thresholds of the comparators are thus stepped in order to put into service the number of dissipative resistors required at each instant.

In a preferred embodiment of the invention, provision is made for means which are responsive to the voltage in at least one of the phases of the generator in order to put the system out of operation in the event of an abnormal voltage drop.

In the event of an excessive voltage drop which may not be corrected by the regulating system proper, the characteristic feature mentioned in the foregoing makes it possible to put the generator out of operation with a view to preventing any damage.

In accordance with a particular feature of the invention, the switches which are in series with the dissipative resistors are triacs and these resistors provide a connection respectively between neutral and the different phases of the generator.

Further distinctive features and advantages of the invention will become apparent from the following detailed description, reference being made to the accompanying drawings which are given by way of example without any limitation being implied, and in which:

FIG. 3 is a characteristic diagram of the transducer which converts the frequency to voltage;

FIG. 4 is a detailed electrical diagram of a comparison and circuit-closing stage;

FIG. 5 is a detailed diagram of the stage for detection and control of abnormal voltage drops.

Figure 1:
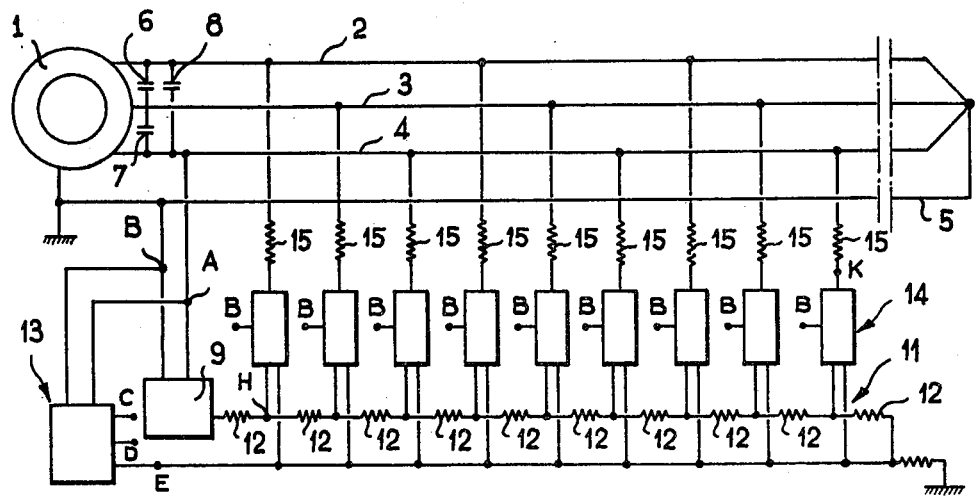
FIG. 1 is an electrical block diagram of the complete system in accordance with the invention.

Referring first to FIG. 1, an asynchronous generator 1 delivers current in three phases 2, 3, 4 constituting a utilization network provided with a grounded neutral conductor 5.

The three phases are connected together through capacitors 6, 7, 8 in order to permit start-up of the generator.

A transducer 9 of known type is connected between the phase 4 and the neutral 5 through terminals A, B in order to detect the frequency of the current and to convert it to a d.c. voltage applied to a line 11 forming a chain of resistors which are all designated by the same reference numeral 12 but can have values which are different from each other.

There is shown in FIG. 3 the characteristic curve of the transducer employed in the example herein described. This curve gives the output voltage $V_s$ (in volts) as a function of the measured frequency (in Hertz). The graduations indicated in the figure gives the numerical correspondence between these two quantities. The practical range of utilization corresponds to the segment DU.

There is also connected between the terminals A and B corresponding to the phase 4 and to the neutral 5 a supply stage 13 which delivers d.c. voltages of $-15$ volts and $-10$ volts to two terminals C, D respectively and which delivers a reference potential $V_r$ to a terminal E. The terminal E is connected to the end of the resistor chain 11 in order to form a loop in which the voltage varies stepwise between $V_s$ and $V_r$, the end of said loop being grounded.

A stage for adjustment of the reference potential $V_r$ is associated with the supply stage 13. These two stages will be described in detail hereinafter and are closely interconnected, with the result that they are designated by the same reference numeral 13 in FIG. 1.

Between the terminal E which delivers the reference potential $V_r$ and each point H which is common to two resistors 12, there is connected a comparison and circuit-closing stage 14 which is also connected to the neutral 5 through the terminal B and to one of the phases through a dissipative resistor 15.

In the example herein described, provision is made for twelve stages 14, only nine of which have been illustrated for the sake of simplification and for a corresponding number of associated resistors 15, four of which are connected to each phase.

Figure 2:
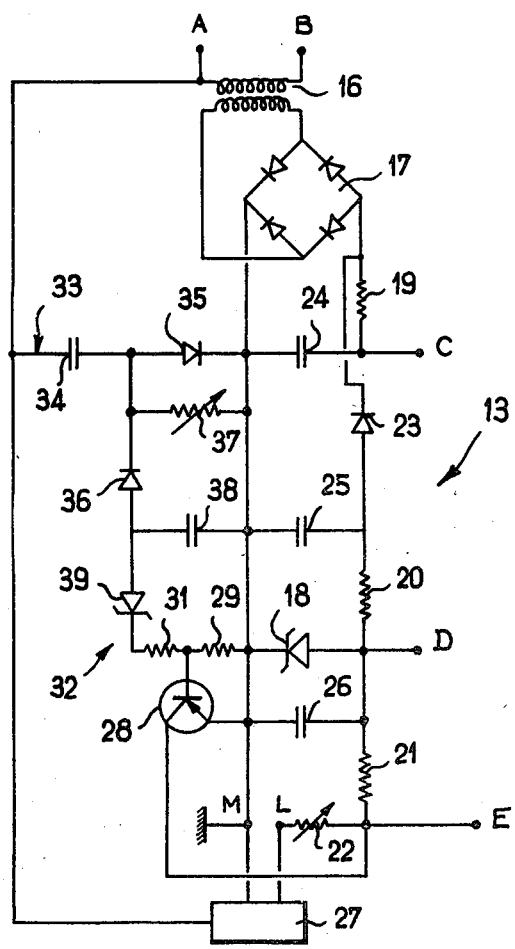
FIG. 2 is a detailed diagram of the stage for supply and adjustment of the reference potential.

Referring now to FIG. 2, the supply stage 13 will be described in detail. This stage comprises a transformer 16 which is connected through the terminals A and B between the phase 4 and the neutral 5 and connected to a bridge rectifier 17 on which are mounted in parallel a first circuit for delivering a d.c. voltage of $-15$ volts to the terminal C and a second circuit for delivering a d.c. voltage of $-10$ volts to the terminal D, the voltage just mentioned being controlled by a Zener diode 18.

Resistors 19, 20, 21 are so designed as to obtain these voltages and also to obtain in the second circuit the reference potential $V_r$ which has the nominal value of $-5$ volts, this reference potential being adjustable by means of a variable resistor 22 which is mounted in series in the second circuit.

A diode 23 which is connected in series in the second circuit prevents reverse currents and shunt-connected capacitors 24, 25, 26 absorb residual alternating-current components.

The operation is self-explanatory if it is assumed that the two terminals L and M are connected together so as to form the second circuit. In actual fact, a stage 27 for the detection and control of abnormal low voltages is connected between these terminals and will be described below in detail.

The overvoltage detection stage shown on the left-hand side of FIG. 2 essentially comprises a transistor 28, the emitter of which is grounded and the base of which is connected to the common point of two resistors 29, 31, said resistors being mounted in series in a loop 32 which is in shunt on the second supply circuit aforesaid between the phase and one of the output terminals of the bridge rectifier 17.

The normal voltage of 220 volts between phase and neutral of the supply network is applied to the above-mentioned loop 32 via a connection 33 to the terminal A and a decoupling capacitor 34. Said loop comprises two rectifier diodes 35, 36 which are connected in series as well as a variable adjustment resistor 37 and a capacitor 38 for absorbing residual alternating-current components, said resistor and capacitor being connected in shunt. Finally, the loop comprises a series-connected Zener diode 39 having a rated voltage of 10 volts.

The collector of the transistor 28 is connected to the terminal E with a branch connection to the resistor 21 of the second supply circuit. If it is postulated for the present and for the sake of argument that the terminals L and R are interconnected, it can be understood that, when the voltage of the supply network exceeds a predetermined value, the transistor 28 begins to conduct and injects a correspondingly higher value of current into the resistor 21, thus causing a diminution of the reference potential $V_r$ at absolute value.

In the example herein described, the components are so designed that the transistor 28 begins to conduct when the power supply voltage attains 240 volts and that the reference voltage $V_r$ is reduced to zero when the power supply voltage attains approximately 260 volts.

Reference being made to FIG. 4, one of the comparison and circuit-closing stages 14 will now be described in detail. This stage comprises an operational amplifier 41 mounted as a comparator, the reversing input of which is connected to the terminal E of the supply stage 13 (FIG. 2) and the non-reversing input of which is connected to one of the terminals H of the line 11 which forms the chain of resistors 12.

One of the bias inputs of the amplifier 41 is connected to the terminal D of the supply stage 13 (namely at −10 volts in the example described) and the other input is connected to ground.

The output of the amplifier 41 is connected through a resistor 42 to the base of a transistor 43, the emitter-collector circuit of which is in series in the trigger circuit of a triac 44 mounted as a switch in a line which connects one of the phases of the supply network through one of the resistors 15 and the terminal K to the terminal B which is connected to the neutral.

Furthermore, the trigger circuit is connected to the terminal C of the supply stage 13 (in this case at −15 volts) through two branches which are mounted in parallel and provided in one case with a resistor 45 connected in series with a luminescent diode 46 which forms an operational indicator and in the other case with a resistor 47.

The output of the amplifier 41 is connected in parallel on the one hand to ground through a resistor 48 and on the other hand through a calibrating resistor 49 to a collecting line 51 connected to a measuring instrument (now shown) which can be a milliammeter.

When the voltage at the terminal H exceeds the voltage at the terminal E which is the reference potential $V_r$, the amplifier 41 changes state and saturates the transistor 43, thereby closing the trigger circuit of the triac 44. The dissipative resistor 15 is then put into service.

Reference being made to FIG. 5, the stage 27 for detection and control of abnormal low voltages will now be described.

This stage comprises a loop circuit connected to the phase terminal A and provided with rectifier diodes 52, 53 and with a shunt-connected filter capacitor 54. Resistors 55, 56 are also connected in shunt in order to permit adjustment of the stage to operating conditions, provision being made for a further resistor 57 which is intended to cooperate with the capacitor 54.

The circuit closes on the base-emitter circuit of a transistor 58, the collector of which is connected to the terminal D (−10 volts). In the emitter circuit are mounted in series a Zener diode 59 and a load resistor 61 between which is connected the base of a transistor 62, the emitter-collector circuit of which connects the terminals L and M (FIG. 2).

It is understood that, if the mains supply voltage falls below a predetermined limiting value, the transistor 58 cuts off, thus causing the transistor 62 to cut-off. The terminals L and M are then isolated from each other and a potential of −10 volts is applied to the terminal E as reference potential $V_r$.

The general operation of the device which has been described in the foregoing will now be explained.

During operation under practically normal conditions, for example, and postulating that the load constituted by the utilization receivers is mainly ohmic, the generator starts-up automatically by means of the capacitors 6, 7, 8.

Assuming that the fluid energy which drives the generator is constant, predetermined and superabundant, the frequency of the current has a natural tendency to acquire a value which is higher as the load on the power system is lower. Potentials which decrease in value from left to right in FIG. 1 are applied to the terminals H by the above-mentioned frequency after this latter has been measured and converted to voltage by the transducer.

As the frequency tends to rise, so the voltage representing said frequency increases at absolute value (as shown in FIG. 3) and so the potential increases at absolute value at each point H. The first point H, the potential of which becomes higher than the reference potential, is the left-hand point of FIG. 1; in consequence, the action produced by the corresponding comparison and circuit-closing stage 14 is such that the resistor 15 which is connected to said stage is put into circuit, that the load on the power system is increased accordingly, thereby tending to produce a reduction in frequency.

If a certain number of resistors 15 are in service at any given moment and if a user reduces his power consumption, the tendency towards an increase in frequency from a stable value of 50 Hz will cause an additional resistor 15 to be put into service in order to counteract this increase. The result thereby achieved is that the total load on the generator is substantially constant.

In the event that a user puts highly inductive loads into service, the problem becomes complicated since the law which relates frequency to voltage is consequently modified. In more exact terms, the frequency corresponding to a given voltage is higher in this particular instance. It is therefore necessary to increase the reference value with respect to the frequency, for example from 50 Hz to 52 Hz.

The overvoltage detection stage described earlier carries out this operation automatically by reducing the reference potential $V_r$ at absolute value when the mains supply voltage tends to rise.

In the event of utilization of a motor, another phenomenon tends to arise. The machine has a tendency to trip or to race but, at the same time, the voltage rises sharply within the power system. If the frequency-regulating system were permitted to operate normally, all the resistors 15 would be put into service in order to counteract such a runaway condition, with the result that the voltage drop would be more marked. Under these circumstances, the regulating system must accordingly be put out of operation. This function is performed by the stage 27 which applies a potential of −10 volts to the reference line. This value is never attained (at absolute value) by the voltage representing the frequency, with the result that none of the resistors 15 is put into service. As soon as the power supply voltage returns to normal, the stage 27 reverts to its initial state and allows the regulation to carry out its intended function.

The invention makes it possible to provide a stabilized utilization voltage in a power system supplied by an independent generator which is in turn driven by the energy of a natural fluid which may or may not be constant, this result being achieved in spite of random variations in power consumption. In its improved embodiments, the invention makes it possible to take reactive loads into account.

An asynchronous generator has been contemplated by way of example in the foregoing by reason of the fact that a generator of this type offers considerable advantages over an alternator as explained earlier.

It is nevertheless worthy of note that the invention remains equally applicable to any alternating-current generator and to an alternator, for example.

We claim:

1. A method for regulating the terminal voltage of an independent, variable-speed alternating-current generator such as a generator driven by a machine under the action of a natural fluid and especially an asynchronous generator, wherein said method consists in carrying out the following operations:
   (a) the voltage is measured in at least one of the phases of the generator;
   (b) the frequency is measured and adjusted automatically with respect to a reference value by putting dissipative resistors in circuit;
   (c) the reference value of the frequency is varied automatically as a function of the variations in voltage, the variation in reference value being in the opposite direction to the variation in measured voltage.

2. A method according to claim 1, wherein the measured frequency is converted to an analog direct-current voltage and wherein the reference value is materialized in the form of a reference potential which is a function of the voltage produced by the generator.

3. A system for regulating the terminal voltage of an independent, variable speed alternating-current generator such as a generator of the asynchronous type which is driven by a machine under the action of a natural fluid, wherein said system comprises:
   (a) means for measuring the voltage in at least one of the phases of the generator;
   (b) means for measuring the frequency;
   (c) means for determining a reference value of frequency;
   (d) dissipative resistors
   (e) means for comparing the measured frequency with the reference value and for putting the dissipative resistors in circuit when the measured frequency becomes higher than the reference value;
   (f) means responsive to the measured voltage in order to cause a variation in the reference value of the frequency in the direction opposite to the variations in measured voltage.

4. A system according to claim 3, wherein the means for putting the dissipative resistors in circuit comprise in the case of each resistor a comparator whose inputs are connected respectively to a reference potential source and to one point of a chain of resistors in series, one end of said chain being in turn connected to the reference potential source and the other end being connected to the output of a transducer for delivering a direct-current voltage which is proportional to the frequency of the current delivered by the generator, the output of each comparator being connected to the control input of a switch which is in series with each dissipative resistor.

5. A system according to claim 3, wherein said system comprises means which are responsive to the voltage in at least one of the phases of the generator in order to put the generator out of operation in the event of an abnormal voltage drop.

6. A system according to claim 4, wherein the switches which are in series with the dissipative resistors are triacs.

7. A system according to claim 3, wherein the dissipative resistors provide a connection respectively between neutral and the different phases of the generator.

* * * * *